US009018301B2

(12) United States Patent
Annable et al.

(10) Patent No.: US 9,018,301 B2
(45) Date of Patent: Apr. 28, 2015

(54) PROCESS, DISPERSIONS AND USE

(75) Inventors: Tom Annable, Manchester (GB); John Patrick O'Donnell, Manchester (GB)

(73) Assignee: Fujifilm Imaging Colorants Limited, Manchester (GB)

(*) Notice: Subject to any disclaimer, the term of this patent is extended or adjusted under 35 U.S.C. 154(b) by 560 days.

(21) Appl. No.: 13/121,585

(22) PCT Filed: Oct. 1, 2009

(86) PCT No.: PCT/GB2009/051284
§ 371 (c)(1),
(2), (4) Date: Mar. 29, 2011

(87) PCT Pub. No.: WO2010/038070
PCT Pub. Date: Apr. 8, 2010

(65) Prior Publication Data
US 2011/0175972 A1 Jul. 21, 2011

(30) Foreign Application Priority Data
Oct. 2, 2008 (GB) .................................. 0817998.8

(51) Int. Cl.
C08L 31/00 (2006.01)
C08F 8/30 (2006.01)
C08F 222/40 (2006.01)
B01J 12/00 (2006.01)
C08G 59/50 (2006.01)
C09D 11/38 (2014.01)
C09B 67/46 (2006.01)
C09D 11/326 (2014.01)

(52) U.S. Cl.
CPC .............. C09D 11/38 (2013.01); C09B 67/009 (2013.01); C09B 67/0091 (2013.01); C09D 11/326 (2013.01)

(58) Field of Classification Search
USPC ........... 523/160, 400; 524/556, 557, 555, 548
See application file for complete search history.

(56) References Cited

U.S. PATENT DOCUMENTS

| 5,596,027 | A | 1/1997 | Mead et al. | 523/161 |
|---|---|---|---|---|
| 6,366,468 | B1* | 4/2002 | Pan | 361/761 |
| 7,008,994 | B1 | 3/2006 | Waki | 524/556 |
| 2004/0242726 | A1 | 12/2004 | Waki et al. | 523/160 |
| 2006/0030641 | A1* | 2/2006 | Tanaka et al. | 523/160 |
| 2006/0041032 | A1* | 2/2006 | Crivello | 522/31 |
| 2006/0178447 | A1 | 8/2006 | Burns et al. | 523/160 |
| 2007/0276089 | A1* | 11/2007 | O'Donnell et al. | 525/61 |
| 2008/0002004 | A1* | 1/2008 | O'Donnell et al. | 347/86 |
| 2008/0071007 | A1 | 3/2008 | Spinelli | 523/200 |
| 2008/0206465 | A1 | 8/2008 | Han-Adebekun et al. | 427/256 |
| 2009/0220693 | A1* | 9/2009 | Takemura et al. | 427/256 |
| 2013/0101859 | A1* | 4/2013 | Hirayama et al. | 428/441 |

FOREIGN PATENT DOCUMENTS

| EP | 1 086 975 | 3/2001 | ............. C08J 3/03 |
|---|---|---|---|
| EP | 1 088 865 | 4/2001 | ............. C09D 11/00 |
| EP | 1 285 951 | 2/2003 | ............. C09D 11/00 |
| EP | 1 364 997 | 11/2003 | ............. C09D 11/00 |
| EP | 1 505 128 | 2/2005 | ............. C09D 17/00 |
| EP | 1 820 829 | 8/2007 | ............. C09D 11/00 |
| EP | 2 025 723 | 2/2009 | ............. C09C 1/56 |
| JP | 11-52424 | 2/1999 | ............. G02F 1/136 |
| JP | 2001-207104 | 7/2001 | ............. C09D 17/00 |
| JP | 2004-27156 | 1/2004 | ............. C09D 11/00 |
| JP | 2004-182878 | 7/2004 | ............. C09D 17/00 |
| JP | 2008-104834 | 5/2008 | ............. A47C 7/46 |
| WO | WO 00/20520 | 4/2000 | ............. C09D 11/00 |
| WO | WO 2004/111140 | 12/2004 | ............. C09D 11/00 |
| WO | WO 2006/064193 | 6/2006 | ............. B01J 13/00 |
| WO | WO 2007/022161 | 2/2007 | ............. C09D 11/00 |
| WO | WO 2007/126145 | 11/2007 | ............. C09D 11/00 |

OTHER PUBLICATIONS

ChemSpider.com—Benzyl glycidyl ether, pp. 1-2 obtained online from www.chemspider.com.*
Water Structure and Science, Martin Chaplin, Apr. 8, 2013, pp. 1-6, botained from http://www.lsbu.ac.uk/water/phase.html.*
Dipropylene Glycol Diglycidyl Ether—p. 1 obtained from http://www.chemspider.com/Chemical-Structure.2298915.html.*
Chemspider.com—Benzyl glycidyl ether, pp. 1-2 obtained online from www.chemspider.com, date: Feb. 28, 2013.*
Dipropylene Glycol Diglycidyl Ether—p. 1 obtained from http://www.chemspider.com/Chemical-Structure.2298915.htm, date Jun. 21, 2013.*
International Search Report and Written Opinion issued Mar. 26, 2010, in PCT Application No. PCT/GB2009/051284.

* cited by examiner

Primary Examiner — Alexander Kollias
(74) Attorney, Agent, or Firm — Morgan, Lewis & Bockius LLP

(57) ABSTRACT

A process for preparing an aqueous pigment dispersion suitable for use in an ink jet printing ink comprising the following steps in the order I) followed by II):
I) providing a dispersion having a sodium chloride critical coagulation concentration of no more than 2.0M, said dispersion comprising a pigment, an aqueous liquid medium and a dispersant having one or more ionic group(s); and
II) reducing the hydrophilicity of the dispersant by reacting at least some, but not all of the ionic group(s) in the dispersant with the one or more hydrophobic compound(s).

20 Claims, No Drawings

PROCESS, DISPERSIONS AND USE

This application is a 371 filing based on PCT/GB2009/051284, filed Oct. 1, 2009, which claims priority to United Kingdom Application No. 0817998.8, filed Oct. 2, 2008, all of which are hereby incorporated by reference in their entirety.

The present invention relates to a process for preparing aqueous pigment dispersions, to the pigment dispersions obtainable by the process and to the use of the process for preparing ink jet printing inks.

Inks are often of one of two types, depending on the type of colorant used. Dye-based inks often comprise a dye dissolved in a liquid medium. Pigment inks comprise a pigment dispersed in a liquid medium. Pigment inks tend to have better ozone-fastness and light-fastness than dye-based inks. However, because the pigment is in the form of a particulate dispersion there is a tendency for pigment particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to increase the colloidal stability of pigment dispersions. It is particularly difficult to provide pigment inks having good colloidal stability when the liquid medium comprises large amounts of water-miscible organic solvents and relatively smaller amounts of water.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic solvent to assist in dissolving the dispersant, for example in the pigment dispersion or milling step.

Commercially, there still remains a need for pigment dispersions which can be used to prepare inks which solve, at least in part, one or more of the abovementioned problems.

According to a first aspect of the present invention there is provided a process for preparing an aqueous pigment dispersion suitable for use in an ink jet printing ink comprising the following steps in the order I) followed by II):

I) providing a dispersion having a sodium chloride critical coagulation concentration of no more than 2.0M, said dispersion comprising a pigment, an aqueous liquid medium and a dispersant having one or more ionic group(s); and II) reducing the hydrophilicity of the dispersant by reacting at least some, but not all of the ionic group(s) in the dispersant with the one or more hydrophobic compound(s).

Definitions

In this description the words "a" and "an" mean one or more unless indicated otherwise. Thus, for example, "a" pigment includes the possibility of there being more than one pigment, similarly "a" dispersant includes the possibility of there being more than one dispersant.

Step I)

The dispersion in step I) can be provided by a process comprising dispersing a pigment in an aqueous liquid medium in the presence of a dispersant having one or more ionic group(s). Dispersion can be performed by any suitable method, including for example bead milling, bead shaking, ultrasonic treatment, homogenizing and/or microfluidizing. A preferred method for dispersing a pigment in an aqueous liquid medium comprises bead milling. Typically, bead milling is performed using a composition comprising milling beads, a dispersant having one or more ionic group(s), an aqueous liquid medium and a relatively high proportion of pigment (often around 15-45% by weight relative to the weight of the aqueous liquid medium). After milling, the milling beads are removed, typically by filtration. The milled dispersion (mill-base) may be diluted with more of the aqueous liquid medium which optionally contains further dispersant, which may be the same as or different to the dispersant included in the aforementioned composition.

Alternatively, the dispersion may be obtained from a commercial source.

Pigment

The pigment may comprise and preferably is an inorganic or organic pigment material or mixture thereof which is insoluble in the aqueous liquid medium.

Preferred organic pigments include, for example, any of the classes of pigments described in the Colour Index International, Third Edition, (1971) and subsequent revisions of, and supplements thereto, under the chapters headed "Pigments". Examples of organic pigments include those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrone, anthanthrone and quinacridone pigments.

Preferred inorganic pigments include carbon black, titanium dioxide, aluminium oxide, iron oxide and silicon dioxide.

In the case of carbon black pigments, these may be prepared in such a fashion that some of the carbon black surface has oxidized groups (e.g. carboxylic acid and/or hydroxy groups). However, the amount of such groups is preferably not so high that the carbon black may be dispersed in water without the aid of a dispersant.

Preferably, the pigment is a cyan, magenta, yellow or a black pigment.

The pigment may be a single chemical species or a mixture comprising two or more chemical species (e.g. a mixture comprising two or more different pigments). In other words, two or more different pigments may be used in the process of the present invention. Where two or more pigments are used these need not be of the same colour or shade.

Preferably, the pigment is not dispersible in an aqueous liquid medium without the aid of a dispersant, i.e. the presence of a dispersant is required to facilitate dispersion. Preferably, the pigment is not chemically surface treated, for example by having ionic groups covalently bonded to its surface (especially not —$CO_2H$ or —$SO_3H$).

Aqueous Liquid Medium

Of course, the aqueous liquid medium is or comprises water. The aqueous liquid medium may optionally contain one or more water-miscible organic solvents.

When the liquid medium comprises a mixture of water and one or more water-miscible organic solvents, the weight ratio of water to all of the water-miscible organic solvents present is preferably from 1:1 to 100:1, more preferably from 2:1 to 50:1 and especially from 3:1 to 20:1.

A preferred liquid medium comprises:
(a) from 50 to 100 parts, more preferably 75 to 100 parts water; and
(b) from 0 to 50 parts, more preferably 0 to 25 parts in total of one or more water-miscible organic solvents;
wherein the parts are by weight and the sum of the parts (a) and (b)=100.

In one embodiment the only liquid in the aqueous liquid medium is water.

The aqueous liquid medium may contain further components in addition to the water and water-miscible organic solvents, for example biocides, surfactants, further dispersant(s) and so on.

The water-miscible organic solvent can be used to increase the solubility of the dispersant and/or the hydrophobic compound(s) in the aqueous; liquid medium.

Preferably, the aqueous liquid medium has a viscosity of less than 100 mPa·s, more preferably less than 50 mPa·s, when measured at 25° C.

Dispersant

The dispersant is preferably polymeric, although it may be non-polymeric.

Preferred dispersants have graft, comb or star structures, more preferably a linear structure. The dispersant may also be cross-linked around the pigment particles so forming an encapsulated shell around each particle.

The dispersant may be a homopolymer but is preferably a copolymer. Preferred copolymers are block copolymers (e.g. its monomer units are distributed throughout the copolymer in blocks such as AAAA-BBBB), more preferably the copolymeric dispersant is a random copolymer (e.g. its monomer units are distributed randomly/statistically throughout the copolymer).

Preferably the dispersant is or comprises a polyester, polyurethane and especially a polymer comprising the repeat units from polymerising ethylenically unsaturated monomers. Preferred polymers obtained from polymerising ethylenically unsaturated monomers are or comprise a poly (meth)acrylate, poly styrenic or poly (meth)acrylates-co-styreneic polymers. The dispersant may be a combination of polymers which may be physically blended or chemically bonded together (e.g. grafted). Polymers obtained from polymerising ethylenically unsaturated monomers may be made by any suitable means. A preferred method is free radical polymerisation of ethylenically unsaturated monomers, especially (meth)acrylates and vinyl monomers containing aromatic groups, e.g. vinyl naphthalene, styrenic monomers and especially benzyl(meth)acrylate monomers. Suitable free radical polymerisation methods include suspension, emulsion, dispersion and preferably solution polymerisation. Preferably, the dispersant is prepared by the solution polymerisation of ethylenically unsaturated monomers in the presence of an aqueous or organic liquid carrier.

The dispersants used in the present invention may be prepared synthetically or they may be obtained from commercial sources.

The dispersant referred to in step I) may be a single dispersant having one or more ionic groups(s) or it may be a mixture comprising more than one dispersant each having one or more ionic group(s).

Preferably, all of the dispersants present in the dispersion referred to in step I) have one or more ionic group(s) which are capable of reacting with the hydrophobic compound(s) so as to reduce the hydrophilicity of the dispersants.

The dispersion in step I) may (although it preferably does not) comprise a further dispersant which has one or more hydrophilic group(s), none of which are capable of reacting with the hydrophobic compound(s).

In some embodiments (as described below) the dispersant in the dispersion as provided in step I) is in the form of a cross-linked shell which encapsulates the pigment particles.

In embodiments where the dispersant as provided in step I) is not in the form of a cross-linked shell which encapsulates the pigment particles (i.e. a conventional dispersant), the dispersant preferably has a number average molecular weight of 3,000 to 100,000, more preferably 5,000 to 50,000. The molecular weight is preferably as measured by gel permeation chromatography ("GPC").

Ionic Group(s) in the Dispersant

The ionic groups may be cationic but are preferably anionic in nature.

Examples of cationic groups include amino, substituted amino, quaternary ammonium, pyridinium, guanide and biguanide groups.

Preferred anionic groups are acidic, especially carboxylic, sulfonic and phosphonic acid groups. When written in ionized form these are $-CO_2^-$, $-SO_3^-$ and $-PO_3^{2-}$ respectively. Acidic sulfates, phosphates and polyphosphates may also be used as the acidic anionic groups.

Preferably, at least some and more preferably all of the ionic groups present in the dispersant are carboxylic acid groups.

The ionic groups present in the dispersant may be in the form of the free acid (i.e. protonated, e.g. $-CO_2H$), the free base (i.e. unprotonated, e.g. $-NH_2$) or they may be in the form of a salt (e.g. sodium salt or acetate salt).

The salt forms of the dispersant are preferred. Preferred salt forms (for acidic ionic groups) include lithium, sodium, potassium, ammonium, substituted ammonium and mixtures thereof.

Preferably, the dispersant has on average two or more, more preferably from 2 to 1,000 and especially from 10 to 500 ionic groups per molecule of dispersant. This is especially preferred for embodiments in which the dispersant is not cross-linked around the pigment particles as provided in step I).

In one preferred embodiment the dispersant has one or more (more preferably two or more) ionic groups and is free from hydrophilic non-ionic groups (e.g. polyethyleneoxy groups).

Preferably, in step I) the dispersant has at least 0.35 mmoles, more s preferably at least 0.9 mmoles, even more preferably at least 1.15 mmoles and especially at least 1.3 mmoles of ionic groups per g of dispersant.

Preferably, in step I) the dispersant has in order of increasing preference no more than 2.65 mmoles, 2.3 mmoles, 2.15 mmoles, 2.0 mmoles and 1.75 mmoles of ionic groups per g of dispersant.

Preferred dispersants have for example from 0.9 to 2.65 mmoles, especially from 1.0 to 2.3 mmoles and most preferably from 1.0 to 2.0 mmoles in total of ionic groups per gram of dispersant. We have found that such dispersants work particularly well in the present invention and can be used to provide pigment inks which offer particularly good optical density on plain paper and which have good colloidal stability.

The amount of ionic groups may be established by any suitable method a preferred method is a titrimetric method, for example acid/base titration.

Preferably, all the ionic groups present in the dispersant are anionic (especially acidic). It is especially preferred that all the ionic groups present in the dispersant are each independently selected from —$CO_2H$, —$SO_3H$ and —$PO_3H_2$ groups and salts thereof. Most preferably, all the ionic groups present in the dispersant are —$CO_2H$ groups or a salt thereof. We have found that when all the ionic groups are —$CO_2H$ groups or a salt thereof the dispersant can be used to prepare inks having particularly good optical density on plain paper. Thus, it is preferred that the above amounts of mmoles of ionic groups corresponds directly with the preferred amounts of mmoles of carboxylic acid groups in the dispersant.

Hydrophilic Non-ionic Groups

The dispersant may comprise small amounts of hydrophilic non-ionic groups provided that the dispersion still has the required critical coagulation concentration.

Examples of hydrophilic non-ionic groups include polyethyleneoxy, hydroxy, polyacrylamide and polyvinyl pyrrolidone, polyvinyl alcohol, hydroxy functional cellulose groups.

Preferably, the dispersant has been obtained from copolymerising monomers, none of which contain any hydrophilic non-ionic groups. Preferably, the dispersant has no hydrophilic non-ionic groups whatsoever.

Self Cross-linkable Dispersants

Particularly, in embodiments in which the dispersant as provided in step I) is not in the form of a cross-linked shell which encapsulates the pigment particles (i.e. a conventional dispersant), the dispersant may optionally contain one or more groups which allow the dispersant to be self-cross-linked.

In one embodiment the dispersant can be self-cross-linked. This may be achieved, by, for example, having unreacted ethylenically unsaturated groups (especially vinyl groups) which are subsequently cross-linked using an initiator (especially a free radical initiator).

In another embodiment the dispersant can be self cross-linked by having one or more ionic group(s) and one or more groups which cross-link with the ionic group(s). For example, the dispersant may have a combination of carboxylic acid ionic groups and epoxy cross-linking groups.

The self cross-linking reaction is preferably performed by heating the dispersion. Suitable catalysts may also be used to speed the self cross-linking reaction.

Dispersant Adsorption

The dispersant is preferably adsorbed onto the pigment. In the embodiment wherein the dispersant as provided in step I) is in the form of a cross-linked shell which encapsulates the pigment particles the dispersant is adsorbed and is also permanently associated with the pigment particles. That is to say the dispersant in this embodiment is much less able or unable to desorb from the pigment particle.

Although, it is possible that the dispersant chemically bonds to pigment surface this is not preferred.

It is preferred that the dispersant has not been prepared by the polymerisation of ethylenically unsaturated monomers in the presence of the pigment.

Critical Coagulation Concentration

Preferably the dispersion in step I) has in order of increasing preference a sodium chloride critical coagulation concentration (CCC) of no, more than 1.8M, no more than 1.6M, no more than 1.4M, no more than 1.2M, no more than 1.0M and no more than 0.8M.

Preferably the dispersion in step I) has a CCC of at least 0.1M, more preferably at least 0.25M and especially at least 0.35M.

In preferred embodiments the CCC is from 0.1 to 2.0M, more preferably from 0.10 to 1.8M, even more preferably from 0.20 to 1.6M and especially from 0.30 to 0.8M.

The CCC is preferably measured by the following steps in the order i) to v):

i) adjusting the concentration of pigment in the dispersion referred to in step I) to 10% by weight by adding or removing water;

ii) preparing a test sample by mixing two drops of the adjusted dispersion prepared in step i) and 1.5 g of a solution of sodium chloride in water having a molarity of 0.5M;

iii) storing the test sample prepared in step ii) for 24 hours at a temperature of 25° C.;

iv) visually assessing the test sample to see if there is significant precipitation at the bottom of the sample;

v) repeating steps i) to iv) using sodium chloride solutions of higher or lower molarity, until the lowest molarity of the sodium chloride solution is established at which the visual assessment referred to in step iv) reveals a significant precipitate at the bottom of the sample, this molarity being the CCC.

By significant precipitate we mean most or all of the pigment initially present in the test sample has precipitated, with mere traces of a precipitate being ignored. By using gravimetric or light transmittance methods it is possible to more accurately measure the degree of precipitation, however, for most purposes a visual assessment is sufficiently accurate and reliable.

In step v) we have found that using sodium chloride solutions of higher or lower molarity to the extent of, for example, 0.05M or 0.1M, will generally be suitable, depending on the accuracy required.

Experimentally, it is often expedient to simply prepare a large number of samples each having a different concentration of sodium chloride in order to quickly establish the CCC.

Dispersants providing a dispersion with the desired CCC value are mentioned below, but in general we find that suitable dispersants contain relatively large amounts of repeat units from hydrophobic monomers, relatively small amounts of repeat units from monomers having ionic groups and very little if any repeat units from monomers having hydrophilic non-ionic groups.

Dispersant Composition

Preferably, the dispersant is obtained by copolymerising ethylenically unsaturated monomers, in a preferred embodiment the dispersant comprises the repeat units from copolymerising the ethylenically unsaturated monomers in components a) to c):

a) one or more hydrophobic ethylenically unsaturated monomers;

b) one or more hydrophilic ethylenically unsaturated monomers having one or more ionic groups; and c) no more than 2 parts of one or more hydrophilic ethylenically unsaturated monomers having one or more hydrophilic non-ionic groups;

wherein the parts are by weight and the sum of the parts a) to c) add up to 100.

Component a) One or More Hydrophobic Ethylenically Unsaturated Monomers

The term hydrophobic means more hydrophobic than the hydrophilic monomers in components b) and c). Preferably, the hydrophobic monomers have no hydrophilic groups whether ionic or non-ionic. For example, they are preferably free of any acidic or polyethyleneoxy groups.

Preferably, the hydrophobic ethylenically unsaturated monomers have a calculated Log P value of at least 1, more preferably from 1 to 6, especially from 2 to 6.

A review by Mannhold, R. and Dross, K. (Quant. Struct-Act. Relat. 15, 403-409, 1996) describes 14 methods for calculating Log P values of compounds and especially drugs. From this review we prefer the "fragmental methods" and especially the fragmental method implemented by ACD labs software. The, calculated Log P of a monomer may be calculated using commercially available computer software, for example using the Log P DB software version 7.04 or a later version of such software (which is available from Advanced Chemistry Development Inc (ACD labs)). Any ionic or ionisable groups are calculated in their neutral (unionised) form. A higher log P value corresponds to a more hydrophobic monomer. We have found the inclusion of such monomers helps provide the desired critical coagulation concentration and aids in adsorbing the dispersant onto the pigment surface.

Preferred hydrophobic ethylenically unsaturated monomers are styrenic monomers (e.g. styrene, alpha methyl styrene), aromatic (meth)acrylates (especially benzyl acrylate and benzyl methacrylate), $C_{1-30}$-hydrocarbyl (meth)acrylates, butadiene, (meth)acrylates containing poly($C_{3-4}$)alkylene oxide groups, (meth)acrylates containing alkylsiloxane or fluorinated alkyl groups and vinyl naphthalene.

Of all the hydrophobic monomers benzyl (meth)acrylate, and more especially benzyl methacrylate (rather than benzyl acrylate) is preferred, in our studies it provides pigment inks having particularly good stability and OD on plain paper.

Preferably, the dispersant comprises the repeat units from copolymerising from 75 to 97, more preferably from 77 to 97, especially from 80 to 93 and most especially from 82 to 91 parts by weight of component a). This is especially so when component a) comprises benzyl (meth)acrylate.

When component a) comprises benzyl (meth)acrylate it preferably comprises at least 50 parts, more preferably at least 60 parts, especially at least 70 and most especially at least 80 parts by weight of benzyl (meth)acylate. The remainder required to obtain the overall preferred amounts of hydrophobic monomers may be provided by any one or more of the above hydrophobic monomers other than benzyl (meth)acrylate.

In a preferred embodiment component a) comprises only benzyl (meth)acrylate, more preferably only benzyl methacrylate.

Component b) One or More Hydrophilic Ethylenically Unsaturated Monomers Having One or More Ionic Groups In component b) each hydrophilic monomer present has one or more ionic groups.

Preferably the monomers in component b) have a calculated Log P value of less than 1, more preferably from 0.99 to −2, especially from 0.99 to 0 and most especially from 0.99 to 0.5 when calculated in the un-neutralised (e.g. free acid) form.

As mentioned above it is preferred that the ionic groups in the dispersant are acid groups and especially carboxylic acid groups.

Thus, component b) preferably comprises one or more monomers having one or more acid groups, preferably one or more carboxylic acid groups.

Preferred hydrophilic ethylencially unsaturated monomers for component b) having one or more ionic groups include beta carboxyl ethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment the component b) comprises only methacrylic acid.

Preferably, the dispersant comprises the repeat units from copolymerising from 3 to 25, more preferably from 3 to 23, especially from 7 to 20 and most especially from 9 to 18 parts by weight of component b). This is especially so when component b) comprises or more preferably is methacrylic acid.

Component c) No More Than 2 Parts of One or More Hydrophilic Ethylenically Unsaturated Monomers Having One or More Hydrophilic Non-ionic Groups In component c) each hydrophilic monomer present has one or more hydrophilic non-ionic groups.

For the purposes of the present invention a monomer having both ionic and non-ionic hydrophilic groups is considered to belong to component c). Thus, all the ethylenically unsaturated monomers in component b) are free from hydrophilic non-ionic groups.

Preferably, the monomers in component c) have calculated Log P values of less than 1, more preferably from 0.99 to −2.

We have found that dispersants containing relatively small amounts of repeat units from hydrophilic ethylenically unsaturated monomers having one or more hydrophilic non-ionic groups tends to much reduce the ability of the final pigment inks to obtain high OD when printed onto plain paper. The presence of these repeat units in the dispersant also causes an increase in the critical coagulation concentration. In our studies we have found that by limiting the amount of these repeat units in the dispersant to no more than 2 parts by weight per 100 parts of all the monomer repeat units, high CCCs and high ODs on plain paper can be better obtained.

Preferably, component c) is less than 1 part, more preferably less than 0.5 parts, especially less than 0.1 parts and most especially 0 parts (i.e. absent). In this way the dispersant contains no repeat units from hydrophilic ethylenically unsaturated monomers having one or more hydrophilic non-ionic-groups.

Examples of hydrophilic non-ionic groups include polyethyleneoxy, polyacryamide, polyvinyl pyrrolidone, hydroxy functional celluloses and poly vinyl alcohol. A readily available ethylenically unsaturated monomer having a hydrophilic non-ionic group is polyethyleneoxy(meth)acrylate.

In embodiments where repeat units from component c) are present in the dispersant (for example 2 parts by weight of component c) then in one embodiment the amount of component c) is deducted from the preferred amounts of component a). In this way the amounts of all the components a) to c) still adds to 100. Thus for examples where 2 parts by weight of component c) is present the preferred amounts of component a) expressed above would become from 73 to 95 (75-2 to 97-2), more preferably from 75 to 95 (77-2 to 97-2), especially from 78 to 91 (80-2 to 93-2) and most especially from 80 to 89 (82-2 to 91-2) parts by weight of component a). In an another embodiment it is possible to deduct the amount of component c) from the preferred amounts of component b) so that again the sum of the amounts of components a) to c) adds to 100 parts by weight.

Preferred Dispersants

In view of the foregoing a preferred dispersant comprises the repeat units from copolymerising the ethylenically unsaturated monomers in components a) to c):

a) from 75 to 97 parts of one or more hydrophobic ethylenically unsaturated monomers comprising at least 50 parts of benzyl (meth)acrylate;
b) from 3 to 25 parts of one or more ethylenically unsaturated monomers having one or more ionic groups, preferably methacrylic acid; and
c) no more than 2 parts, preferably no parts of hydrophilic ethylenically unsaturated monomers having one or more hydrophilic non-ionic groups;

wherein the parts are by weight and the sum of the parts a) to c) add up to 100.

As mentioned above, preferably, benzyl(meth)acrylate is benzyl methacrylate (not benzyl acrylate).

It is preferred that the only hydrophobic monomer in component a) is benzyl methacrylate:

Preferred Dispersion Characteristics

The pigment particles in the dispersion referred to in step I) preferably have an average particle size of no more than 1 micron, more preferably from 10 to 1000nm, especially from 50 to 500nm and most especially from 50 to 300 nm. The average particle size is preferably measured by a light scattering technique. Preferably the average particle size is a Z-average or volume average size.

Preferably, the dispersant is such that it was able to provide the above mentioned preferred pigment particle size in step I) in an aqueous liquid medium, more preferably in an aqueous liquid medium' which comprises at least 50%, even more preferably at least 60% and especially at least 70% by weight of water, the remainder being one or more water-miscible organic solvents. This is one of the advantages of the present invention in that it facilitates the use of aqueous liquid media for dispersing the pigment with the dispersant whilst additionally providing inks which offer good OD when printed onto plain paper. This contrasts with some known pigment dispersion processes which use entirely or predominantly organic liquid media.

Preferably the pH of the dispersion in step I) is from 5 to 12, more preferably from 7 to 11.

Preferably, the dispersant has been adsorbed onto the pigment surface by a comminution process. Examples of suitable comminution processes include high pressure homogenising, microfluidizing, ultrasound and especially bead milling. A composition comprising the aqueous liquid medium, the pigment and the dispersant are preferably comminuted to the above preferred particle sizes.

Step II) Reducing the Hydrophilicity of the Dispersant

In step II) the hydrophobic compound(s) may react with some but not all of the ionic group(s) in the dispersant so as to form a hydrophobic salt. For example anionic groups in the dispersant can be reacted with a hydrophobic amine to form a hydrophobic salt.

It is more preferred that the hydrophobic compound(s) react with some but not all of the ionic group(s) in the dispersant so as to form a covalent bond therebetween.

Preferably, at least one of the hydrophobic compound(s) used in step II) has a calculated Log P of greater than 1, more preferably greater than 1.5 and especially greater than 2. Preferably, the log P of at least one of the hydrophobic compounds is from 1.01 to 10, more preferably from 1.5 to 6 and especially from 2 to 6. More preferably, all of the hydrophobic compound(s) have the preferred Log P values. The methods for calculating the Log P are as described above in relation to the hydrophobic ethylenically unsaturated monomers (component a) which are preferably present as repeat units in the dispersant.

Preferably the hydrophobic compound(s) contains at least one hydrophobic group selected from aryl, heteroaryl, $C_{3-30}$ alkyl, fluoro $C_{1-30}$ alkyl, poly($C_{3-4}$ alkoxy) and $C_{1-30}$ alkoxy silane groups.

When the hydrophobic compound(s) contains an alkyl group, the alkyl group may be linear, branched or cyclic.

Preferably, the hydrophobic compound(s) have no hydrophilic groups other than the groups needed to effect the reaction with the ionic group(s) in the dispersant. Thus, preferred hydrophobic compound(s) contain no groups such as for example hydroxy, polyethyleneoxy, carboxylic acid, sulfonic acid or phosphonic acid groups.

Preferably, the hydrophobic compound(s) have a solubility in water of less than 5% by weight, more preferably less than 2% by weight and especially less than 1% by weight.

The hydrophobic compound(s) each independently have one or more groups capable of reacting with the ionic group(s) in the dispersant.

The hydrophobic compound(s) may comprise an endcapping agent, a cross-linking agent or a mixture thereof. In one embodiment the hydrophobic compounds comprise a cross-linking agent, in another all of the hydrophobic compound(s) are cross-linking agents. The hydrophobic endcapping agent refers to hydrophobic compounds which only have one group capable of reacting with the ionic group(s) in the dispersant. In this way endcapping agents hydrophobically cap some but not all of the ionic groups in the dispersant. The hydrophobic cross-linking agent refers to hydrophobic compounds which have two or more, preferably from two to ten and especially from two to four groups which are capable of reacting with the ionic group(s) in the dispersant. In this way the hydrophobic cross-linking agent cross-links some but not all of the ionic groups in the dispersant to form a shell of dispersant which encapsulates the pigment particles. The cross-linking reaction is performed in the presence of the pigment and the aqueous liquid medium.

As mentioned above the preferred reactive groups in the hydrophobic compound forms a covalent bonds to the ionic groups in the dispersant.

The preferred reactive group(s) in the hydrophobic compound(s) (capable of forming covalent bonds to ionic groups) include isocyanate, aziridine, n-methylol, carbodiimide, oxetane, oxazoline and especially epoxy groups. These reactive groups are particularly useful with dispersants wherein the ionic group(s) is/are carboxylic acid group(s).

A particularly preferred combination is where at least one of the hydrophobic compounds has an epoxy group and the dispersant has a carboxylic acid group. More preferably, the only reactive group(s) present in any hydrophobic compound are epoxy group(s).

Hydrophobic Endcapping Agent

Preferably the hydrophobic end-capping agent has a number averaged molecular weight of less than 5,000, more preferably less than 1,000.

Preferably the hydrophobic end-capping agent is of Formula (1):

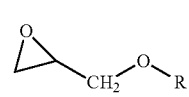

Formula (1)

wherein R is or comprises a hydrophobic group.

Preferably R is a hydrophobic group as hereinbefore described.

Particularly preferred end-capping agents are of Formulae (2), (3) or (4):

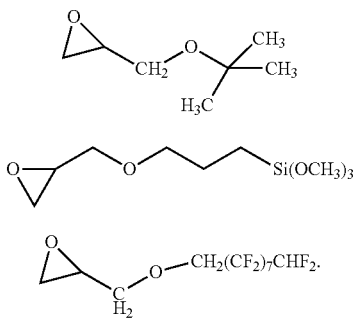

Hydrophobic Cross-linking Agents

Preferred hydrophobic cross-linking agents are those of Formulae (5) to (8):

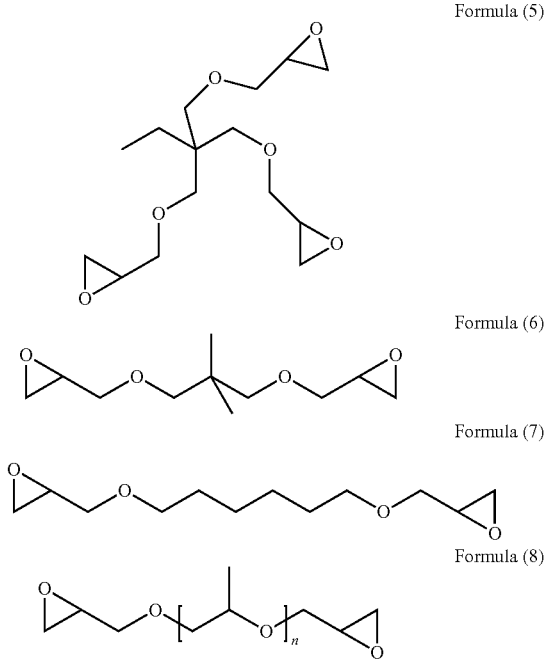

wherein $n$ is from 1 to 20.

Reaction in Step II)

Preferably, the reaction in step II) is performed by means of heating the dispersion, preferably to a temperature of from 40 to 100° C. To accelerate or promote the reaction it is sometimes useful to add a catalyst.

The pH of the dispersion in step II) is preferably from 5 to 13, especially from 7 to 12. When the reactive groups in the hydrophobic compound(s) are epoxy it is preferred that the reaction is performed in the presence of a borate salt and/or boric acid.

At Least Some but not All of the Ionic Group(s)

According to the present invention at least some, but not all of the ionic group(s) in the dispersant are reacted with the hydrophobic compound(s). If all the ionic groups are reacted we find that the colloidal stability of the dispersion tends to suffer and the pigment dispersion may aggregate or flocculate over time.

It is preferred to control the extent of the reaction in step II) by controlling the stoichiometry of the reactive group(s) in the hydrophobic compound(s) with the ionic group(s) in the dispersant.

Preferably, the hydrophobic compound(s) are present in step II) in such an amount that the number of mmoles of reactive groups present in all of the hydrophobic compound(s) divided by the number of mmoles of ionic groups present in the dispersant just prior to step II) is preferably from 0.1 to 0.9, more preferably from 0.1 to 0.6 and especially from 0.2 to 0.5. We have found that by so limiting the extent of the reaction in step II) the final inks can be obtained which simultaneously exhibit good OD when printed onto plain paper and which also have good colloidal dispersion stability.

By the words "just prior to step II)" we mean that for example in the embodiment described below wherein a hydrophilic cross-linking agent is used between steps I) and II) to cross-link some of the ionic groups in the dispersant it is this reduced amount of ionic groups as they are just prior to step II) which are used to calculate the preferred amounts of the hydrophobic compound(s).

In cases where the amounts of ionic group(s) present just prior to step II) needs to be determined this can readily be done by titrimetric methods such as for example titration with a base.

Encapsulated Pigments

It is preferred that the process of the present invention provides aqueous pigment dispersions wherein the pigment particles are encapsulated with a cross-linked dispersant.

In one embodiment the dispersant as provided in step I) is already encapsulated around the pigment. Preferably, this has been achieved by cross-linking the dispersant in the presence of the aqueous liquid medium and the pigment. Suitable methods to prepare such encapsulated pigments are described in for example WO06/064193, WO05/056700 and WO05/061087.

In another embodiment at some point in the process the dispersant is cross-linked in the presence of the pigment and the aqueous liquid medium. In this way the resulting pigment particles are encapsulated with the dispersant. This provides dispersions and inks having much improved colloidal stability especially in aqueous liquid media which comprise relatively large proportions of water-miscible organic solvents.

Preferably, the cross-linking is effected by an epoxy cross-linking agent and component b) comprises one or more monomers having one or more carboxylic acid groups.

The cross-linking step may be performed at anytime, for example between steps I) and II), during step II), after step II) or any combination thereof.

The cross-linking may be effected by a hydrophobic cross-linking agent, a hydrophilic cross-linking agent or by means of self cross-linking groups in the dispersant or any combination thereof.

Preferably, the optional cross-linking step is performed by a process comprising mixing a composition comprising the following components in the specified proportions:
  a) 30 to 99.7 parts, preferably 50 to 97 parts, of the aqueous liquid medium;
  b) 0.1 to 50 parts, preferably 1 to 30 parts, of the pigment;
  c) 0.1 to 30 parts, preferably 1 to 30 parts, of the dispersant; and
  d) 0.001 to 30 parts, preferably 0.01 to 10 parts, of a cross-linking agent;
wherein the parts are by weight.

Optional Hydrophilic Cross-linking

In one embodiment the dispersant is cross-linked with one or more hydrophilic cross-linking agent(s) at some point in the process of the present invention such that at least some ionic group(s) remain in the dispersant. The hydrophilic cross-linking reaction is performed in the presence of the pigment and the aqueous liquid medium. In this way the dispersant forms a shell which encapsulates the pigment particles. The cross-linking reaction with the hydrophilic cross-linking agent may be performed between steps I) and II), during step II), after step II) or any combination thereof. In embodiments where a hydrophilic cross-linking agent is used it is preferably reacted with the dispersant between steps I) and II).

Preferred hydrophilic cross-linking agents preferably have a calculated Log P value as hereinbefore mentioned of no more than 1.0, more preferably from 1.0 to −3. Preferably, the hydrophilic cross-linking agent has a solubility in water of at least 5% by weight.

The hydrophilic cross-linking agent may react with any co-reactive groups in the dispersant. In this optional step the cross-linkable groups in the dispersant which react need not be, but preferably are the ionic groups.

The hydrophilic cross-linking agent does not result in an increased hydrophilicity of the final dispersant even though it would tend to do so, for example, in one embodiment the hydrophilicity imparted by the hydrophilic cross-linking agent is more than offset by a loss in the, co-reactive ionic groups in the dispersant and/or by step II) itself.

If more hydrophilic or larger amounts of hydrophilic cross-linking agents are used then the hydrophobicity and proportions of the hydrophobic compounds in step II) should be increased such that the overall process results in reducing the hydrophilicity of the dispersant (as compared to its initial state as provided in step I).

Examples of hydrophilic cross-linking agents include those comprising amine, ethyleneoxy, hydroxy, cationic and anionic groups when having the aforementioned preferred Log P values.

The cross-linking groups in the hydrophilic cross-linking agents may be any of those previously described above for the reactive group(s) in the hydrophobic compound(s), again the epoxy group is preferred.

When present the preferred hydrophilic cross-linking agent is the diglycidyl ether of polyethylene glycol (especially those with less than 15, preferably less than 10, especially less than 5 ethyleneoxy repeat units). At least one ethyleneoxy repeat unit being present.

Thus one embodiment is a process for preparing an aqueous pigment dispersion suitable for use in an ink jet printing ink comprising the following steps in the order I) followed by II):

I) providing a dispersion having a sodium chloride critical coagulation concentration of no more than 2.0M, said dispersion comprising a pigment, an aqueous liquid medium and a dispersant having one or more ionic group(s);

IA) cross-linking the dispersant with one or more hydrophilic cross-linking agent(s) such that at least some ionic group(s) remain in the dispersant; and II) reducing the hydrophilicity of the dispersant by reacting at least some, but not all of the ionic group(s) in the dispersant with one or more hydrophobic compound(s).

In a preferred embodiment the dispersant is not cross-linked with one or more hydrophilic cross-linking agent(s). More generally, the overall process of the present invention preferably comprises no steps which would tend to increase the hydrophilicity of the dispersant. In this way step II) does not need to overcome any additional hydrophilic groups originating from, for example, the hydrophilic cross-linking agent.

Optional Dispersant Self-cross-linking

As mentioned above the dispersant may contain groups which make it capable of self cross-linking. In this embodiment it is preferred to self cross-link the dispersant at some point during the process of the present invention. The self cross-linking may be performed between steps I) and II), during step II), after step II) or a combination thereof. The self cross-linking reaction may be effected by the heating of the dispersion.

When the dispersant contains unreacted ethylenically unsaturated groups these can be self cross-linked by for example the addition of a initiator (e.g. a persulfate) and by heating the dispersion. The self cross-linking takes place in the presence of the pigment and the aqueous liquid medium. Accordingly, the dispersant forms a shell which encapsulates the pigment particles.

Final Dispersion Properties

Preferably, the final dispersion resulting from the process of the present invention has a CCC of no more than 0.2M. Preferably, the CCC of the final dispersion is from 0.1 to 2.0M, more preferably from 0.10 to 1.8M, even more preferably from 0.20 to 1.6M and especially from 0.30 to 1.0M.

Effect of Step II)

While not wishing to be limited to any particular theory, during the process according to the first aspect, of the present invention at least some but not all of the ionic group(s) in the dispersant are reacted with one or more hydrophobic compounds which reduces the hydrophilicity (increases the hydrophobicity) of the dispersant.

In our studies we found that if step II) was performed on a dispersion provided in step I) which had a CCC much above 2.0M (e.g. 4.0M) the resulting dispersion and inks therefrom exhibited no detectable or significant increase in the OD when printed onto plain paper. We surprisingly found that if the dispersion in step I) has a sodium chloride CCC of no more the 2.0M then the reaction in step II) provides dispersions suitable for preparing inks which do provide prints on plain paper with improved OD. Often the OD benefit can be as much as 0.1 or 0.2 OD units which is highly desirable. In this manner steps I) and II) form a synergistic pair.

The improvements in optical density on plain paper may be because inks containing the dispersion made by the present process have an increased propensity to precipitate when in contact with plain paper. We suspect the mechanism by which the precipitation occurs on plain paper is a "salting out" phenomenon where salts present in plain paper interact with the pigment dispersions arising from the present process.

Drying or Concentration

The process according to first aspect of the present invention may additionally comprise the step of removing some, or all of the aqueous liquid medium from the product. The aqueous liquid medium may be removed by methods such as evaporation and filtration. In this way the pigment dispersion may be concentrated or converted into the form of a dry solid. When the liquid medium comprises a mixture of water and a water-miscible organic solvent it may be desirable to selectively remove the water-miscible organic solvent. This may be performed by for example distillation or by membrane treatment.

Reduction in the Hydrophilicity of the Dispersant

The reduction in the hydrophilicity of the dispersant can be confirmed and measured by any one of a number of techniques.

The reduction in hydrophilicity can preferably be confirmed by analytical methods which measure the number of ionic groups in the dispersant immediately before and after step II). For example, where the ionic groups are carboxylic acid groups a reduction in the number of carboxylic acid groups present in the dispersant as a result of step II) can be confirmed by titration.

A reduction in the hydrophilicity of the dispersant from step II) may also be confirmed by solubility or dispersibility characteristics, partitioning between water and n-octanol and methanol/water wetting. One method for demonstrating the reduction in hydrophilicity is to measure the methanol/water wetting properties of the pigment dispersion as provided in step I) as against that after step II). In this method dispersions are dried down by evaporating off the aqueous liquid medium. Then the dried dispersions are contacted with a liquid comprising only water and methanol at different weight proportions. The methanol wetting value (expressed in weight % of methanol) is taken to be the highest relative amount of methanol which will wet and disperse the dried dispersion. Thus, for example an initial dispersion provided in step I) might have a methanol wetting value of 50%, whilst after step II) the value may have risen to 70%.

It is also possible to monitor the reduction in the hydrophilicity of the dispersant, by means of measuring the zeta potential of the pigment dispersions in water. A lower hydrophilicity often corresponds to lower zeta potential (especially where the dispersant contain no or few hydrophilic non-ionic groups).

Purification of the Dispersion

Preferably, the process according to the first aspect of the present invention further comprises the step of purifying the aqueous pigment dispersion. Preferably, the purification process is performed after step II). The purification can be by any suitable method including microfiltration, deionizer resins, centrifugation followed by decantation and washing. A preferred method is membrane filtration especially ultrafiltration. Preferred ultrafiltration membranes have a pore size of about 0.1 microns. Preferably, the dispersion after step II) is washed with from 5 to 50 volumes of purified water based on the volume of the dispersion. Preferably, the water used in the ultrafiltration process is deionized, distilled or has been purified by reverse osmosis. A preferred method of assessing when the dispersion has been sufficiently purified is to measure the conductivity of the permeate stream from the ultrafiltration stage and to continue adding further volumes of pure water until the permeate stream has a conductivity of less than 100 μS/cm, more preferably less than 50 μS/cm. The ultrafiltration is preferably performed on a dispersion which has from 10 to 15% by weight of pigment in the dispersion. We have found that purification can in some instances provide final dispersions and inks, having further improved OD when printed onto plain paper.

Additives

It is preferred that the process of the present invention further comprises adding one or, more additives selected from viscosity modifiers, pH buffers, metal chelating agents, surfactants, corrosion inhibitors, biocides, dyes, water miscible organic solvent(s) and/or kogation reducing additives. Preferably, these are added after step II).

Products of the Process

According to a second aspect of the present invention there is provided an aqueous pigment dispersion obtained or obtainable by the process according to the first aspect of the present invention.

Inks and Ink Jet Printing Inks

The aqueous pigment dispersion according to the second aspect of the present invention and as prepared by the process according to the first aspect of the present invention may be used to prepare an ink, especially an ink jet printing ink.

Preferably, the ink has a viscosity of less than 50 mPa·s, more preferably less than 30 mPa·s and especially less than 15 mPa·s, when measured at a temperature of 25° C.

Preferably, the ink has a surface tension of 20 to 65 dynes/cm, more preferably 30 to 60 dynes/cm, when measured at a temperature of 25° C.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals: Parts per million as used above refers to parts by weight relative to the total weight of the ink. These low concentrations of ions in the resultant ink can be achieved by the abovementioned purification step.

Preferably, the process for making the ink includes a step for removing particles having, a particle size of more than 1 micron in diameter, for example by filtration or centrifugation. Preferably the ink has less than 10%, more preferably less than 2% and especially less than 1% by weight of particles having a size of greater than 1 micron in diameter.

Preferably, the amount of pigment in the ink is from 0.1 to 15%, more preferably from 1 to 10% and especially from 3 to 10% by weight.

Organic Solvents in the Inks

Preferably the ink contains water and organic solvent in the weight ratio of 99:1 to 1:99, more preferably 99:1 to 50:50 and especially 95:5 to 70:30.

Preferred organic solvents are water-miscible organic solvents and mixtures of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably, the liquid medium comprises water and 2 or more, especially from 2 to 8, water-miscible organic solvents.

Especially preferred water-miscible organic solvents for the ink are cyclic amides, especially 2-pyrrolidohe, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and di-$C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising -a mixture of water and one or more organic solvents are described in U.S. Pat. Nos. 4,963,189, 4,703,113, 4,626,284 and EP 4,251,50A.

The ink jet printing ink can readily be added to the chamber of an ink jet printer cartridge.

Applications

The process of the present invention prepares aqueous pigment dispersions especially suitable for use in an ink jet printing ink. In addition the aqueous pigment dispersions may be used in inks, paints, tints, cosmetics, thermoplastics and thermosets.

According to a third aspect of the present invention there is provided the use of the process according to the first aspect of the present invention for preparing an ink jet printing ink. Preferably, this use is for the technical purpose of providing an ink jet printing ink which provides higher optical density when printed onto plain paper.

The ink jet printing inks containing aqueous pigment dispersions prepared by the process of the present invention may in some embodiments be used with papers which comprise fixing agents to improve, for example, wet fastness, optical density or to reduce colour bleeding. In another embodiment ink jet printing inks containing aqueous pigment dispersions prepared by the process of the present invention may be used alongside fixing agents. For example, an ink jet printer cartridge might comprise an ink as described above in one chamber and a liquid comprising a fixating agent in a further chamber. In this way the ink jet printer may apply the ink and the fixing agent to a substrate.

Fixing agents are well known in the art and include such things as metal salts, acids and cationic materials.

The invention is further illustrated by the following Examples in which all parts and percentages are by weight unless otherwise stated.

EXAMPLES

Such that the Experiments described below may be scaled as is required the amounts have been expressed in parts. The actual experiments were performed wherein all parts were grams.

1. Dispersant Preparation
1.1 Preparation of Dispersant (1)

A monomer feed composition was prepared by mixing benzyl methacrylate (871 parts), methacrylic acid (129 parts) and isopropanol (375 parts).

An initiator feed composition was prepared by mixing 2,2'-azobis(2-methylbutyronitrile) (22.05 parts) and isopropanol (187.5 parts).

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 2 hours. The reactor vessel contents were maintained at 80° C. for a further 4 hours before cooling to 25° C. The resulting dispersant was then isolated from the reactor vessel contents by rotary evaporation under reduced pressure. This was designated as Dispersant (1). Dispersant (1), was an acrylic copolymer which had a number average molecular weight of 47,999, a weight average molecular weight of 89,332 and a polydispersity of 1.86 as measured by GPC. Dispersant (1) had an acid value corresponding to 1.5 mmoles of acid groups/g of dispersant. Dispersant (1) contained the repeat units from benzyl methacrylate and methacrylic acid in the proportions 87.1:12.9 by weight respectively.

1.2 Preparation of Dispersant (2)

Dispersant (2) was prepared in exactly the same way as Dispersant (1) except that the monomers used were benzyl methacrylate (785 parts) and methacrylic acid (215 parts). This was designated as Dispersant (2). Dispersant (2), was an acrylic copolymer which had a number average molecular weight of 48,462, a weight average molecular weight of 86,938 and a polydispersity of 1.79 as measured by GPC. Dispersant (2) had an acid value corresponding to 2.5 mmoles of acid groups/g of dispersant. Dispersant (2) contained the repeat units from Benzyl methacrylate and methacrylic acid in the proportions 78.5:21.5 by weight respectively. As is apparent from the higher proportion of methacrylic acid, Dispersant (2) is somewhat more hydrophilic than Dispersant (1).

1.3 Preparation of Comparative Dispersant (1)

Comparative Dispersant (1) was prepared in exactly the same manner as Dispersant (1) except that the monomers used were 2-ethyl hexyl methacylate (350 parts), methyl methacrylate (413 parts) and methacrylic acid (237 parts). This was designated as Comparative Dispersant (1). Comparative Dispersant (1), was an acrylic copolymer which had a number average molecular weight of 45;593, a weight average molecular weight of 75,945 and a polydispersity of 1.67 as measured by GPC. Comparative Dispersant (1) had an acid value corresponding to 2.75 mmoles of acid groups/g of dispersant. Comparative Dispersant (1) contained the repeat units from 2-ethyl hexyl methacrylate, methyl methacrylate and methacrylic acid in the proportions 35:41.3:23.7 by weight respectively. As can be seen Comparative Dispersant (1) is more hydrophilic than Dispersant (1) and Dispersant (2).

2. Preparation of Dispersant Solutions
2.1 Dispersant Solution (1)

Dispersant (1) (154.3 parts) was dissolved in water to make up to (1000 parts) and neutralised with potassium hydroxide aqueous solution to give an aqueous solution having a pH of about 9. This resulted in Dispersant Solution (1) which contained approximately 15% by weight of Dispersant (1).

2.2 Dispersant Solution (2)

Dispersant (2) (350 parts) was dissolved in water to make up to (1000 parts) and neutralised with potassium hydroxide aqueous solution to give an aqueous solution having a pH of about 9. This resulted in Dispersant Solution (2) which contained approximately 35% by weight of Dispersant (2).

2.3 Comparative Dispersant Solution (1)

Comparative Dispersant (1) (461 parts) was dissolved in water to make up to (1000 parts) and neutralised with potassium hydroxide aqueous solution to give an aqueous solution having a pH of about 9. This resulted in Comparative Dispersant Solution (1) which contained approximately 46% by weight of Comparative Dispersant (1).

3. Preparation of Mill-bases
3.1 Mill-base (1)

Pigment paste (149.55 parts of 15:3 Copper phthalocyanine blue TRB2 pigment, ex Dainichiseika having a solids content of 50% by weight), Dispersant solution (1) (243.03 parts) and water (107.4 parts) were premixed together using a Silverson™ mixer for 30 minutes.

After premixing the premixture was transferred to a vertical bead mill containing 1 mm beads. The premixture was milled for at least 4 hours, longer if the particle size still showed a decrease in size with milling time.

The milling beads were then filtered from the milled mixture. The milled mixture was then adjusted to 10% by weight of pigment by the addition of pure water. This resulted in Mill-base (1).

3.2 Mill-base (2)

Mill-base (2) was prepared in exactly the same way as Mill-base (1) except that Pigment paste (149.55 parts of 15:3 Copper phthalocyanine blue TRB2 pigment, ex Dainichiseika having a solids content of 50% by weight), Dispersant solution (2) (107.17 parts) and water (243.3 parts) were used in place of the corresponding components described in Mill-base (1).

3.3 Comparative Mill-base (1)

Comparative Mill-base (1) was prepared in exactly the same way as Mill-base (1) except that Pigment paste (119.64 parts of 15:3 Copper phthalocyanine blue TRB2 pigment, ex Dainichiseika having a solids content of 50% by weight), Comparative Dispersant solution (1) (65.08 parts) and water (215.3 parts) were used in place of the corresponding components described in Mill-base (1).

4. Critical Coagulation Concentration Measurements

The sodium chloride critical coagulation concentrations for Mill-base (1), (2) and Comparative Mill-base (1) were measured by the method previously described using 0.1M steps in the concentration of NaCl.

The results showed marked differences in the CCC values which we attribute largely to the differences in the dispersant composition.

TABLE 1

CCC values as measured for the Mill-bases and Comparative Mill-base

| Mill-base | Sodium chloride CCC value |
|---|---|
| Mill-base (1) | 0.5M |
| Mill-base (2) | 1.5M |
| Comparative Mill-base (1) | >4.0M |

Comparative Mill-base (1) did not precipitate in 4.0M NaCl solution and thus the CCC was simply recorded as >4.0M.

5. Reducing the Hydrophilicity of the Dispersant 5.1 Preparation of Reacted Dispersions and Comparative Reacted Dispersions Mill-base (1) as prepared in point 3.1 (75 parts) was reacted with 0.122 parts of tert-butyl glycidyl ether (a hydrophobic endcapping agent) in the presence of boric acid solution (0.938 parts at a solids content of 6.8% by weight, the boric acid was obtained from Aldrich). The endcapping agent was added in a sufficient stoichiometric amount so that the epoxy groups therein can potentially react with about 17% of the carboxylic acid groups initially present in the dispersant. The reaction was effected by means of heating the Mill-base to a temperature of 65° C. for 5 hours whilst stirring throughout. This prepared Reacted dispersion (1).

Further Reacted Dispersions and Comparative Reacted Dispersions were prepared exactly as for Reacted Dispersion (1) above except that the components and amounts used were as described in Table 2 below.

TABLE 2

| Reacted Dispersion reference | Mill-base, amount | End-capping agent, amount | Boric acid solution amount | Stoichiometric amount of epoxy groups:carboxy groups |
|---|---|---|---|---|
| 2 | Mill-base 1, 75, parts | Tert-butyl glycidyl ether, 0.244 parts | 1.875 parts | 33% |
| 3 | Mill-base 1, 75 parts | Benzyl glycidyl ether, 0.154 parts | 0.938 parts | 17% |
| 4 | Mill-base 1, 75 parts | Benzyl glycidyl ether, 0.308 parts | 1.875 parts | 33% |
| 5 | Mill-base 2, 75 parts | Tert-butyl glycidyl ether, 0.122 parts | 0.938 parts | 10% |
| 6 | Mill-base 2, 75 parts | Tert-butyl glycidyl ether, 0.244 parts | 1.875 parts | 20% |
| 7 | Mill-base 2, 75 parts | Benzyl glycidyl ether, 0.154 parts | 0.938 parts | 10% |
| 8 | Mill-base 2, 75 parts | Benzyl glycidyl ether, 0.308 parts | 1.875 parts | 20% |

| Comparative Reacted Dispersion reference | Comparative Mill-base, amount | End-capping agent, amount | Boric acid solution amount | Stoichiometric amount of epoxy groups:carboxy groups |
|---|---|---|---|---|
| 1 | Comparative Mill-base 1, 75 parts | Tert-butyl glycidyl ether, 0.122 | 0.938 parts | 9% |
| 2 | Comparative Mill-base 1, 75 parts | Tert-butyl glycidyl ether, 0.244 | 1.875 parts | 18% |

6. Preparation of Inks (1) to (8) and Comparative Inks (1) to (2)

Each of the Reacted dispersions and Comparative Reactive dispersions above were used to prepare an Ink or Comparative ink with a corresponding Ink reference and having the following composition.

| | |
|---|---|
| Reacted Dispersion/Comparative Reacted Dispersion | 40.00 parts |
| 2-Pyrrolidone | 3.00 parts |
| Glycerol | 15.00 parts |
| 1,2 Hexane diol | 4.00 parts |
| Ethylene glycol | 5.00 parts |
| Surfynol ™ 465 | 0.50 parts |
| Pure water | 32.50 parts |

Surfynol ™ 465 is a surfactant available from Airproducts.

Thus, for example Reacted Dispersion (1) was used to prepare Ink (1) and Comparative Reactive Dispersion (2) prepared Comparative Ink (2).

In addition Comparative Ink (M1) was prepared exactly as above for Ink (1) except that Mill-base (1') was used in place of Reacted Dispersion (1).

In an analogous way Comparative Ink (M2) was prepared containing Mill-base (2) and Comparative Ink (M3) was prepared containing Comparative Mill-base (1).

7. Preparation of Prints

Each of the Inks and Comparative Inks described above in point 6. were printed onto plain (untreated) paper of different kinds, namely Canon GF500, Office Planner and Xerox 4200 papers. Printing was performed by means of an SEC D88 ink jet printer printing 100% blocks of colour.

8. Measurement of Optical Density

For each print the reflectance optical density (ROD) and chroma was measured using a Gretag Macbeth key wizard V2.5 Spectrolino photodensitometer instrument, illuminated using a D65 light source at an observer angle of 2° and with no filter fitted. Measurements were taken at least two points along the print and were then averaged.

9. Results of Optical Density Measurements

The results of the ROD and chroma measurements are summarised below in Tables 3, 4 and 5. In Tables 3, 4 and 5 "C. Ink" is an abbreviation of Comparative Ink and "Ink" refers to an ink of prepared by a process according to the first aspect of the present invention.

TABLE 3

Prints prepared from Inks containing Mill-base (1) having a CCC of 0.5M

| | Endcapping agent | Paper type | ROD | Chroma |
|---|---|---|---|---|
| C. Ink | | | | |
| M1 | None | CANON GF500 | 1.2 | 48.76 |
| M1 | None | OFFICE PLANNER | 1.2 | 49.08 |
| M1 | None | XEROX 4200 | 1.19 | 50.1 |
| Ink | | | | |
| 1 | tert-Butyl glycidyl ether | CANON GF500 | 1.24 | 51.05 |
| 1 | tert-Butyl glycidyl ether | OFFICE PLANNER | 1.11 | 48.16 |
| 1 | tert-Butyl glycidyl ether | XEROX 4200 | 1.2 | 51.39 |
| 2 | tert-Butyl glycidyl ether | CANON GF500 | 1.25 | 49.5 |
| 2 | tert-Butyl glycidyl ether | OFFICE PLANNER | 1.2 | 49.43 |
| 2 | tert-Butyl glycidyl ether | XEROX 4200 | 1.23 | 51.24 |
| 3 | Benzyl glycidyl ether | CANON GF500 | 1.27 | 51.48 |
| 3 | Benzyl glycidyl ether | OFFICE PLANNER | 1.26 | 50.73 |
| 3 | Benzyl glycidyl ether | XEROX 4200 | 1.22 | 51.86 |
| 4 | Benzyl glycidyl ether | CANON GF500 | 1.28 | 51.91 |
| 4 | Benzyl glycidyl ether | OFFICE PLANNER | 1.26 | 50.5 |
| 4 | Benzyl glycidyl ether | XEROX 4200 | 1.23 | 51.96 |

TABLE 4

Prints prepared from Inks containing Mill-base (2) having a CCC of 1.5M

| | Endcapping agent | Paper type | ROD | Chroma |
|---|---|---|---|---|
| C. Ink | | | | |
| M2 | None | CANON GF500 | 1.12 | 47.03 |
| M2 | None | OFFICE PLANNER | 1.14 | 47 |
| M2 | None | XEROX 4200 | 1.11 | 48.29 |
| Ink | | | | |
| 5 | tert-Butyl glycidyl ether | CANON GF500 | 1.13 | 47.64 |
| 5 | tert-Butyl glycidyl ether | OFFICE PLANNER | 1.17 | 47.81 |
| 5 | tert-Butyl glycidyl ether | XEROX 4200 | 1.15 | 49.3 |
| 6 | tert-Butyl glycidyl ether | CANON GF500 | 1.16 | 48.57 |
| 6 | tert-Butyl glycidyl ether | OFFICE PLANNER | 1.18 | 48.54 |
| 6 | tert-Butyl glycidyl ether | XEROX 4200 | 1.15 | 49.56 |
| 7 | Benzyl glycidyl ether | CANON GF500 | 1.14 | 47.74 |
| 7 | Benzyl glycidyl ether | OFFICE PLANNER | 1.17 | 48.24 |
| 7 | Benzyl glycidyl ether | XEROX 4200 | 1.15 | 49.87 |
| 8 | Benzyl glycidyl ether | CANON GF500 | 1.13 | 48.6 |
| 8 | Benzyl glycidyl ether | OFFICE PLANNER | 1.18 | 48.43 |
| 8 | Benzyl glycidyl ether | XEROX 4200 | 1.18 | 50.32 |

TABLE 5

Prints prepared from Inks containing Comparative Mill-base (1) having a CCC of >4.0M

| C. Ink | Endcapping agent | Paper type | ROD | Chroma |
|---|---|---|---|---|
| M3 | None | CANON GF500 | 1.07 | 44.75 |
| M3 | None | OFFICE PLANNER | 1.06 | 44.92 |
| M3 | None | XEROX 4200 | 1.06 | 45.24 |
| 1 | tert-Butyl glycidyl ether | CANON GF500 | 1.04 | 46.44 |
| 1 | tert-Butyl glycidyl ether | OFFICE PLANNER | 1.05 | 45.25 |
| 1 | tert-Butyl glycidyl ether | XEROX 4200 | 1.04 | 47 |
| 2 | tert-Butyl glycidyl ether | CANON GF500 | 1.09 | 44.26 |
| 2 | tert-Butyl glycidyl ether | OFFICE PLANNER | 1.08 | 43.74 |
| 2 | tert-Butyl glycidyl ether | XEROX 4200 | 1.07 | 45.97 |

The results in Tables 3 to 5 show the following:
  i) The reaction in step II) of the process according to the first aspect of the present invention improves the ROD in Tables 3 and 4 but not in Table 5. We have found that this is linked to the CCC of the mill-bases in Tables 3 and 4 which have a value of no more than 2.0M as required by the present invention, whilst the CCC of the comparative mill-base in Table 5 is >4.0M.
  ii) The improvements in ROD can be seen in a range of different types of plain paper.
  iii) Different kinds of hydrophobic compounds may be employed.
  iv) Best improvements in ROD are seen when the stiochiometric amount of reactive groups in the hydrophobic compound to the ionic groups in the dispersant is about 33% rather than for example 17%.
  v) The base-line ROD for the unreacted Inks M1, M2 and M3 is higher when the CCC is lower.
  vi) The chroma is largely unaffected by the reaction in step II) of the present invention.

10. Further Inks

The further inks described in Tables I and II may be prepared wherein Mill-base (1) and Mill-base (2) are as defined above and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Table I and II:
PG=propylene glycol
DEG=diethylene glycol
NMP=N-methyl pyrrolidone
DMK=dimethylketone
IPA=isopropanol
MEOH=methanol
2P=2-pyrrolidone
MIBK=methylisobutyl ketone
P12=propane-1,2-diol
BDL=butane-2,3-diol
Surf=Surfynol™ 465 from Airproducts
PHO=$Na_2HPO_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| Mill-base | Mill-base Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 |  | 6 | 3 |  |  |  |  | 5 |  | 1 |  |
| 1 | 30 | 59.8 |  | 5 | 5 |  | 0.2 |  |  |  |  |  |  |  |
| 1 | 40 | 45 | 3 |  | 3 | 3 |  |  |  |  | 5 | 1 |  |  |
| 1 | 40 | 51 |  | 8 |  |  |  |  |  |  |  |  | 1 |  |
| 1 | 40 | 45.8 | 5 |  |  |  |  | 0.2 | 4 |  |  | 5 |  |  |
| 1 | 40 | 41 |  |  | 9 |  | 0.5 | 0.5 |  |  | 9 |  |  |  |
| 1 | 40 | 10 | 4 | 15 | 3 | 3 |  |  | 6 | 10 | 5 | 4 |  |  |
| 1 | 40 | 30 |  | 20 |  |  |  |  | 9 |  |  |  |  | 1 |
| 1 | 50 | 25 | 5 | 4 |  | 5 |  |  |  | 6 |  | 5 |  |  |
| 1 | 50 | 29.7 | 3 | 5 | 2 | 10 |  | 0.3 |  |  |  |  |  |  |
| 2 | 50 | 15 |  | 5 | 4 | 6 |  |  | 5 | 4 | 6 | 5 |  |  |
| 2 | 50 | 46 |  |  |  |  |  |  |  | 4 |  |  |  |  |
| 2 | 40 | 50 | 5 |  |  |  |  |  | 5 |  |  |  |  |  |
| 2 | 40 | 40 | 2 | 6 | 2 | 5 |  |  | 1 |  | 4 |  |  |  |
| 2 | 40 | 40 |  | 5 |  |  |  |  |  |  | 15 |  |  |  |
| 2 | 40 | 44 |  |  | 11 |  |  |  |  |  | 5 |  |  |  |
| 2 | 50 | 30 | 2 |  |  | 10 |  |  |  |  | 2 | 6 |  |  |
| 2 | 50 | 39.7 |  |  | 7 |  | 0.3 |  | 3 |  |  |  |  |  |
| 2 | 40 | 29 | 2 | 20 | 2 | 1 |  |  |  |  | 3 | 3 |  |  |
| 2 | 40 | 51 |  |  | 4 |  |  |  |  |  | 5 |  |  |  |
| 2 | 40 | 40 |  |  |  |  |  |  |  |  |  |  | 20 |  |
| 2 | 40 | 40 |  |  |  |  |  |  |  |  |  |  |  | 20 |

TABLE II

| Mill-base | Mill-base content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 1 | 30 | 49.8 | 15 |  |  | 0.2 |  |  |  |  | 5 |  |  |  |
| 1 | 30 | 58.8 |  | 5 |  |  |  |  |  | 1.2 |  | 5 |  |  |
| 1 | 40 | 44.6 | 5 | 5 |  | 0.1 | 4 | 0.2 |  |  |  |  |  | 1 |
| 1 | 40 | 5 |  | 6 | 4 | 5 |  |  |  | 0.12 |  |  |  |  |
| 1 | 40 | 49.8 | 4 | 8 |  |  |  |  |  |  |  | 6 |  |  |
| 1 | 40 | 8 |  |  | 10 |  | 0.3 |  | 5 | 0.2 |  |  |  |  |
| 1 | 50 | 41.7 |  | 5 | 5 |  |  | 0.3 |  |  |  |  |  |  |
| 1 | 50 | 44.8 |  | 10 | 4 |  |  |  | 1 |  | 4 | 11 |  |  |
| 1 | 40 | 39.7 | 4 | 10 | 3 |  |  |  | 2 |  | 6 |  |  |  |
| 1 | 40 | 20 |  |  | 6 |  |  |  |  |  | 3 |  |  |  |
| 2 | 40 | 35 |  | 9 | 7 |  | 2 |  |  | 0.95 | 5 |  | 1 |  |
| 2 | 40 | 51 | 5 | 11 |  |  |  |  |  |  | 6 |  |  |  |
| 2 | 50 | 35.0 |  |  | 7 |  |  |  |  |  | 7 |  |  |  |
| 2 | 50 | 5 | 5 | 5 | 4.1 |  | 0.2 | 0.1 | 5 | 0.1 | 5 |  |  |  |
| 2 | 40 | 38 |  | 10 |  | 1 |  |  |  |  |  |  |  |  |
| 2 | 40 | 36 |  |  |  |  |  | 10 |  |  |  |  |  |  |
| 2 | 30 | 24.5 |  |  | 5 |  |  | 12 |  |  | 5 |  |  |  |
| 2 | 30 | 50 | 2 |  | 8 |  |  | 15 |  |  | 5 |  |  |  |
| 2 | 40 | 50 |  |  |  |  |  | 8 |  | 12 |  |  |  |  |
| 2 | 40 | 48 |  | 10 |  |  |  |  |  |  |  |  | 10 |  |
| 2 | 40 | 40 |  |  |  |  |  |  |  |  | 10 |  |  | 10 |
| 2 | 40 | 40 |  |  |  |  |  |  |  |  |  |  |  |  |
| 2 | 40 | 40 |  |  |  |  |  |  |  |  |  |  |  |  |
| 2 | 40 | 40 |  |  |  |  |  |  |  |  |  |  |  |  |

The invention claimed is:

1. A process for preparing an aqueous pigment dispersion suitable for use in an ink jet printing ink comprising the following steps in the order I) followed by II):

I) providing a dispersion having a sodium chloride critical coagulation concentration of no more than 2.0M, said dispersion comprising
a pigment;
an aqueous liquid medium and;
a dispersant having one or more ionic group(s); and II) reducing the hydrophilicity of the dispersant by reacting a portion less than the total of the ionic group(s) in the dispersant with one or more hydrophobic compound(s) comprising a hydrophobic end-capping agent of Formula (1):

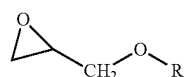

Formula (1)

wherein R comprises a hydrophobic group;
and/or hydrophobic cross-linking agent of Formula (5), (6) or (7):

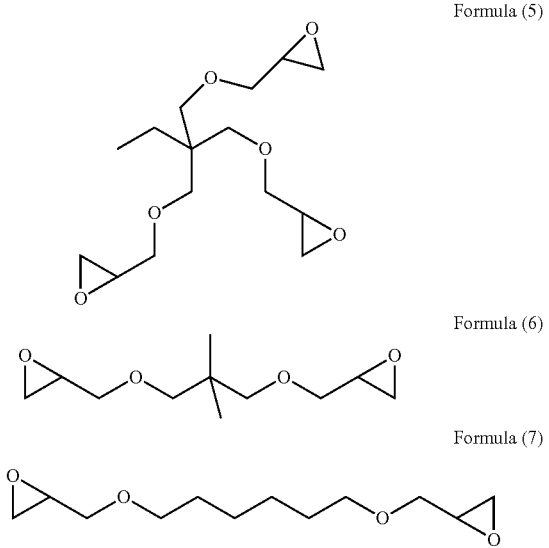

Formula (5)

Formula (6)

Formula (7)

wherein the dispersant comprises the repeat units from copolymerising monomers a) to c):
- a) from 75 to 97 parts of one or more hydrophobic ethylenically unsaturated monomers comprising at least 50 parts of benzyl(meth)acrylate;
- b) from 3 to 25 parts of one or more ethylenically unsaturated monomers having one or more ionic groups; and
- c) no more than 2 parts of one or more hydrophilic ethylenically unsaturated monomers having one or more hydrophilic non-ionic groups; and wherein the parts are by weight and the sum of the parts a) to c) add up to 100.

2. The process according to claim 1 wherein the sodium chloride critical coagulation concentration of the dispersion in step I) is no more than 1.6M.

3. The process according to claim 1 wherein the sodium chloride critical coagulation concentration of the dispersion in step I) is no more than 0.8M.

4. The process according to claim 1 wherein the sodium chloride critical coagulation concentration of the dispersion in step I) is at least 0.10M.

5. The process according to claim 1 wherein the dispersant in the dispersion in step I) comprises no more than 2.15 mmoles of ionic groups per g of dispersant.

6. The process according to claim 1 wherein the dispersant in the dispersion in step I) comprises at least 0.9 mmoles of ionic groups per g of dispersant.

7. The process according to claim 1 wherein the hydrophobic compound(s) are present in step II) in such an amount that the number of mmoles of reactive groups present in all of the hydrophobic compound(s) divided by the number of mmoles of ionic group(s) present in the dispersant just prior to step II) is from 0.1 to 0.6.

8. The process according to claim 1 wherein the hydrophobic compound(s) react with a portion less than the total of the ionic group(s) in the dispersant so as to form a covalent bond therebetween.

9. The process according to claim 1 wherein the aqueous pigment dispersion comprises pigment particles encapsulated with a cross-linked dispersant.

10. The process according to claim 1 wherein the hydrophobic compound(s) comprise the endcapping agent and the cross-linking agent.

11. The process according to claim 1 wherein the hydrophobic compound(s) consist of the cross-linking agent.

12. The process according to claim 1 wherein the hydrophobic compound(s) consist of the endcapping agent.

13. The process according to claim 1 wherein the one or more hydrophilic non-ionic groups are selected from the group consisting of polyethyleneoxy, polyacrylamide, polyvinyl pyrrolidone, hydroxyl functional cellulose and poly vinyl alcohol.

14. The process according to claim 1 further comprising the step of purifying the aqueous pigment dispersion.

15. The process according to claim 1 wherein the aqueous pigment dispersion further comprises adding one or more additives selected from the group consisting of viscosity modifiers, pH buffers, metal chelating agents, surfactants, corrosion inhibitors, biocides, dyes, water-miscible organic solvent(s) and kogation reducing additives.

16. The process according to claim 1 wherein the hydrophobic group selected from the group consisting of aryl, heteroaryl, $C_{3-30}$ alkyl, fluoro $C_{1-30}$ alkyl, poly($C_{3-4}$ alkoxy) and $C_{1-30}$ alkoxy silane groups.

17. The process according to claim 1 wherein the one or more hydrophobic compound(s) comprise an end capping agent of the Formula (2), (3) or (4):

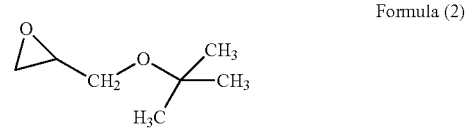

Formula (2)

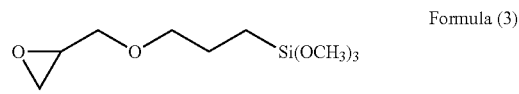

Formula (3)

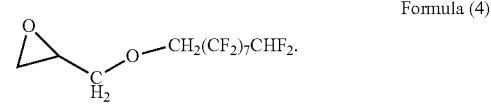

Formula (4)

18. The process according to claim 1 wherein the one or more hydrophobic compound(s) comprises an end-capping agent of the Formula (1),

Formula (1)

wherein R is or comprises a hydrophobic group.

19. The process according to claim 18 wherein the one or more hydrophobic compound(s) are selected from the group consisting of tert-butyl glycidyl ether and benzyl glycidyl ether.

20. The process according to claim 1 wherein the one or more hydrophobic compound(s) are selected from the group consisting of hydrophobic cross-linking agents of Formula (5), (6) or (7):

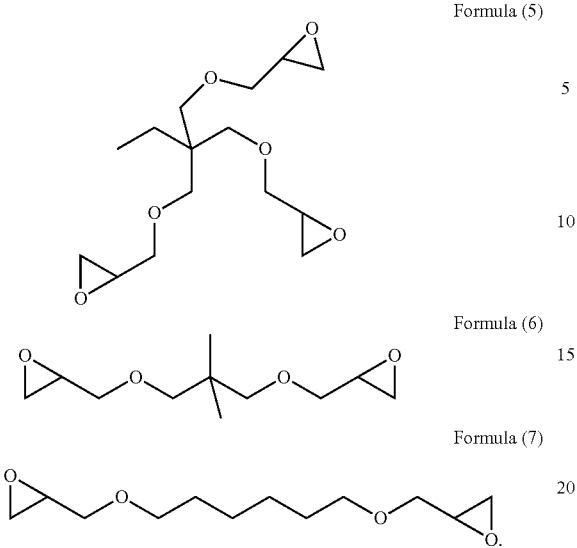
Formula (5)
Formula (6)
Formula (7)
* * * * *